US011943677B2

(12) United States Patent
Nagaraja et al.

(10) Patent No.: US 11,943,677 B2
(45) Date of Patent: Mar. 26, 2024

(54) BEAM SELECTION AND RADIO LINK FAILURE DURING BEAM RECOVERY

(71) Applicant: QUALCOMM Incorporated, San Diego, CA (US)

(72) Inventors: Sumeeth Nagaraja, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/707,626

(22) Filed: Sep. 18, 2017

(65) Prior Publication Data

US 2018/0206170 A1      Jul. 19, 2018

Related U.S. Application Data

(60) Provisional application No. 62/465,112, filed on Feb. 28, 2017, provisional application No. 62/448,369, filed on Jan. 19, 2017.

(51) Int. Cl.
*H04W 36/30* (2009.01)
*H04B 7/0408* (2017.01)
(Continued)

(52) U.S. Cl.
CPC ........ *H04W 36/305* (2018.08); *H04B 7/0408* (2013.01); *H04B 7/0695* (2013.01);
(Continued)

(58) Field of Classification Search
CPC ............................ H04W 36/30; H04W 36/305
(Continued)

(56) References Cited

U.S. PATENT DOCUMENTS 9,425,923 B2    8/2016  Ratasuk et al.
2011/0113137 A1*  5/2011  Ramachandran ...... H04B 7/063
                                                        709/224
(Continued)

FOREIGN PATENT DOCUMENTS

CN    103875191 A    6/2014
CN    104115419 A    10/2014
(Continued)

OTHER PUBLICATIONS

Interdigital Communications: "Considerations on Beam Recovery for NR", 3GPP Draft; R1-1700723 Considerations on Beam Recovery for NR, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), 5 Pages, XP051208247, Retrieved from the Internet: URL: http://www.3gpp.org/ftp/Meetings_3GPP_SYNC/RAN1/Docs/ [retrieved on Jan. 16, 2017].
(Continued)

*Primary Examiner* — Chuck Huynh
(74) *Attorney, Agent, or Firm* — Patterson + Sheridan, L.L.P.

(57) ABSTRACT

Certain aspects of the present disclosure relate to methods and apparatus for beam recovery and radio link failure (RLF) in communications systems using beamforming and operating according to new radio (NR) technologies. An exemplary method that may be performed by a UE includes communicating using beamforming with a base station (BS) via a transmit beam and a receive beam of an active beam pair and obtaining an indication of one or more alternative beams for the UE to use to send a beam recovery message to the BS in the event the transmit beam and the receive beam of the active beam pair become misaligned.

17 Claims, 11 Drawing Sheets

(51) Int. Cl.
| | |
|---|---|
| H04B 7/06 | (2006.01) |
| H04B 7/08 | (2006.01) |
| H04W 16/28 | (2009.01) |
| H04W 76/19 | (2018.01) |
| H04W 76/27 | (2018.01) |
| H04W 36/00 | (2009.01) |
| H04W 36/06 | (2009.01) |
| H04W 36/18 | (2009.01) |

(52) U.S. Cl.
CPC ............ *H04B 7/088* (2013.01); *H04W 16/28* (2013.01); *H04W 76/19* (2018.02); *H04W 76/27* (2018.02); *H04W 36/0005* (2013.01); *H04W 36/0088* (2013.01); *H04W 36/06* (2013.01); *H04W 36/18* (2013.01)

(58) Field of Classification Search
USPC ......................................................... 455/436
See application file for complete search history.

(56) References Cited

U.S. PATENT DOCUMENTS

| | | | | |
|---|---|---|---|---|
| 2015/0257073 | A1* | 9/2015 | Park | H04B 7/0408 370/331 |
| 2016/0150435 | A1* | 5/2016 | Baek | H04W 16/28 370/252 |
| 2016/0353510 | A1 | 12/2016 | Zhang et al. | |
| 2017/0367114 | A1* | 12/2017 | Ahn | H04W 72/1284 |
| 2019/0075600 | A1* | 3/2019 | Kwon | H04W 74/0833 |

FOREIGN PATENT DOCUMENTS

| | | | |
|---|---|---|---|
| KR | 20140030244 A | 3/2014 | |
| WO | 2016127403 A1 | 8/2016 | |
| WO | WO-2016127403 A1 * | 8/2016 | ........... H04B 7/0617 |
| WO | WO-2017026929 A1 | 2/2017 | |

OTHER PUBLICATIONS

Mediatek Inc: "RLM and RLF in HF NR", 3GPP Draft; R2-1700246, 3rd Generation Partnership Project (3GPP), Mobile Competence Centre; 650, Route Des Lucioles; F-06921 Sophia-Antipolis Cedex; France, vol. RAN WG2, No. Spokane, USA; Jan. 17, 2017-Jan. 19, 2017, Jan. 17, 2017 (Jan. 17, 2017), 5 Pages, XP051210828, Retrieved from the Internet: URL: http://www.3gpp.org/ftp/Meetings_3GPP_SYNC/RAN2/Docs/ [retrieved on Jan. 17, 2017].

Partial International Search Report—PCT/US2017/067068—ISA/EPO—dated Apr. 5, 2018.

Samsung: "Motivation and Considerations of Beam Recovery", 3GPP Draft; R2-167945 Motivation and Considerations of Beam Recovery, 3rd Generation Partnership Project (3GPP), Mobile Competence Centre; 650, Route Des Lucioles; F-06921 Sophia-Antipolis Cedex; vol. RAN WG2, No. Reno, USA; Nov. 14, 2016-Nov. 18, 2016, Nov. 13, 2016 (Nov. 13, 2016), 6 Pages, XP051177675, Retrieved from the Internet: URL: http://www.3gpp.org/ftp/Meetings_3GPP_SYNC/RAN2/Docs/ [retrieved on Nov. 13, 2016].

Sony: "Fallback Beam and RLF", 3GPP Draft; R2-1700144_FALLBACK Beam and RLF V2, 3rd Generation Partnership Project (3GPP), Mobile Competence Centre; 650, Route Des Lucioles; F-06921 Sophia-Antipolis Cedex; France, vol. RAN WG2, No. Spokane, USA; Jan. 17, 2017-Jan. 19, 2017, Jan. 17, 2017 (Jan. 17, 2017), 2 Pages, XP051210729, Retrieved from the Internet: URL: http://www.3gpp.org/ftp/Meetings_3GPP_SYNC/RAN2/Docs/ [retrieved on Jan. 17, 2017].

International Search Report and Written Opinion—PCT/US2017/067068—ISA/EPO—dated Jun. 6, 2018.

QUALCOMM Incorporated: "Beam Recovery Procedure", 3GPP TSG-RAN WG1 NR AdHoc, R1-1700803, Jan. 16-20, 2017 Spokane, USA, 4 Pages.

Samsung et al., "WF on Beam Recovery", 3GPP TSG RAN WG1 #86bis, R1-1610964, Lisbon, Portugal Aug. 10-14, 2016, 4 Pages.

Samsung: "NR Beam Switching to Overcome Beam Pair Link Blocking", 3GPP TSG-RAN WG2 2017 NR Ad-hoc Meeting, R2-1700599, Spokane, USA, Jan. 17-19, 2017, 6 Pages.

Samsung: "Discussion on UE Initiated Beam Switching", 3GPP Draft, 3GPP TSG RAN WG1 Meeting #87, R1-1700923, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 16, 2017 (Jan. 16, 2017), XP051208439, 2 pages.

Taiwan Search Report—TW106144561—TIPO—dated Mar. 10, 2021.

CATT: "Discussion on Beam Recovery", 3GPP Draft, 3GPP TSG RAN WG1 AH_NR Meeting, R1-1700225, Spokane, USA Jan. 16-20, 2017, 3 Pages.

CMCC: "Discussion on UE Triggered Beam Reporting for Beam Recovery," 3GPP TSG RAN WG1 NR Ad-Hoc Meeting, R1-1700436, Spokane, USA, Jan. 16-20, 2017, 5 pages.

Samsung: "Discussions on Beam Recovery Mechanism," 3GPP TSG RAN WG1 Meeting #87, R1-1612514, Reno, USA, Nov. 14-18, 2016, 3 pages.

* cited by examiner

BEAM SELECTION AND RADIO LINK FAILURE DURING BEAM RECOVERY

CROSS-REFERENCE TO RELATED APPLICATIONS

The present Application for Patent claims priority to U.S. Provisional Application No. 62/448,369, filed Jan. 19, 2017, and U.S. Provisional Application No. 62/465,112, filed Feb. 28, 2017, both of which are assigned to the assignee of the present application and hereby expressly incorporated by reference herein in their entireties.

BACKGROUND

Field of the Disclosure

The present disclosure relates generally to communication systems, and more particularly, to methods and apparatus for beam recovery and radio link failure (RLF) in communications systems using beamforming and operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission and reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for beam recovery and radio link failure (RLF) in communications systems using beamforming and operating according to new radio (NR) technologies.

Certain aspects provide a method for wireless communication by a user equipment. The method generally includes communicating using beamforming with a base station (BS) via a transmit beam and a receive beam of an active beam pair and obtaining an indication of one or more alternative beams for the UE to use to send a beam recovery message to the BS if the transmit beam and the receive beam of the active beam pair become misaligned.

Certain aspects provide a method for wireless communication by a base station. The method generally includes communicating using beamforming with a user equipment (UE) via a transmit beam and a receive beam of an active beam pair and sending an indication to the UE of one or more alternative beams for the UE to use to send a beam recovery message to the BS if the transmit beam and the receive beam of the active beam pair become misaligned.

Certain aspects provide a method for wireless communication by a base station. The method generally includes communicating using beamforming with a user equipment (UE) via a transmit beam and a receive beam of an active beam pair and sending a configuration to the UE indicating a number of failed beam recovery attempts, of the active beam pair, to cause the UE to take action regarding a radio link failure (RLF) procedure.

Certain aspects provide a method for wireless communication by a user equipment. The method generally includes communicating using beamforming with a base station (BS) via a transmit beam and a receive beam of an active beam pair, obtaining a configuration from the BS indicating a number of failed beam recovery attempts, of the active beam pair, to cause the UE to take action regarding a radio link failure (RLF) procedure, and taking action regarding the RLF procedure, based on making the indicated number of failed beam recovery attempts of the active beam pair.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
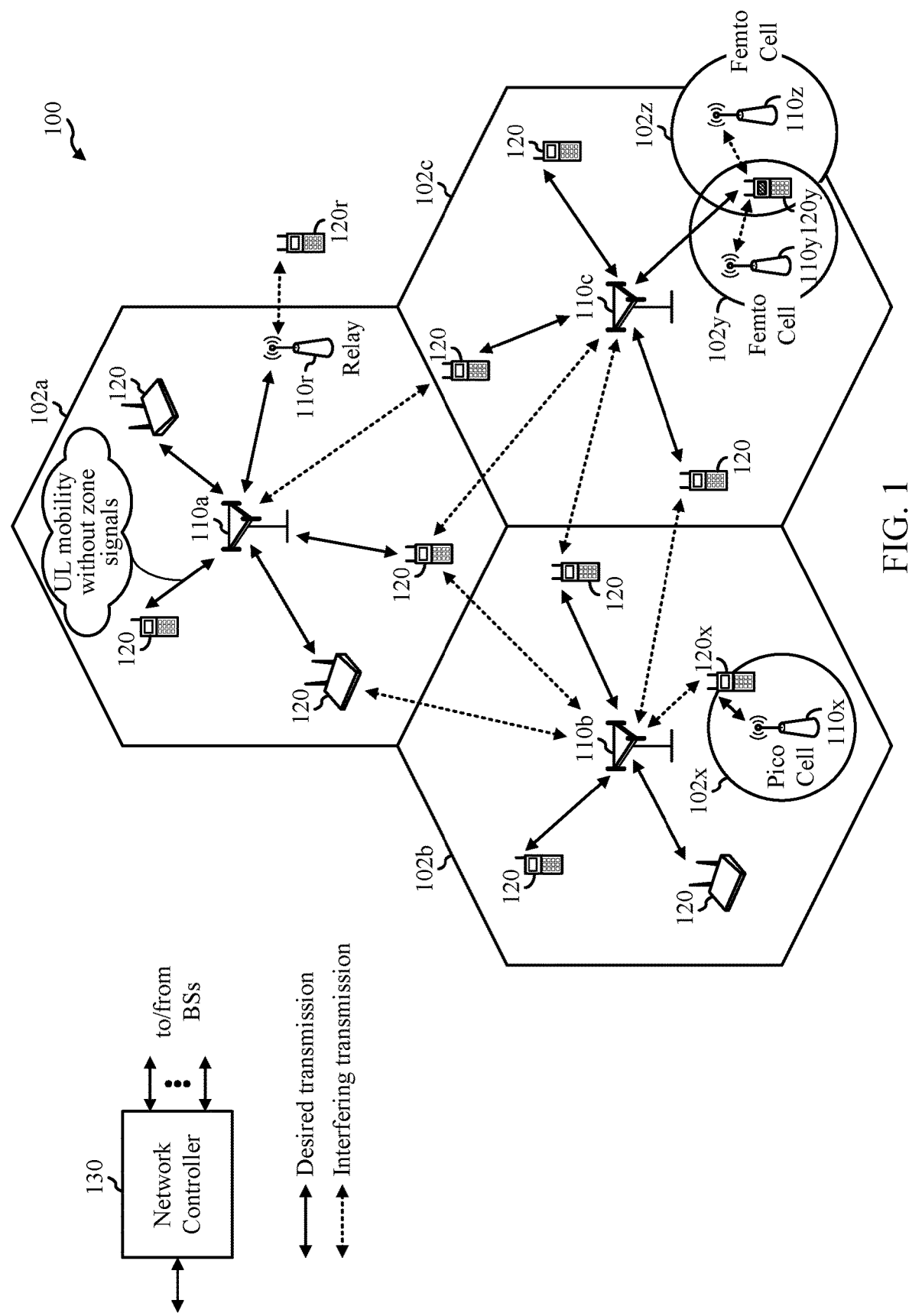
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to beam recovery and radio link failure (RLF) in communications systems using beamforming. According to aspects of the present disclosure, a nodeB (NB) may be communicating with a UE via a transmit beam and a receive beam of an active beam pair. The NB (an example of a base station) may indicate to the UE one or more alternative beams for the UE to use to send one or more beam recovery messages to the NB in the event the transmit beam and the receive beam become misaligned. If the transmit and the receive beam become misaligned, the UE may select one or more of the alternative beams to use to send a beam recovery message to the NB.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.).

A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission and reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover (HO), and/or measurement based on the indicated cell type.

Figure 2:
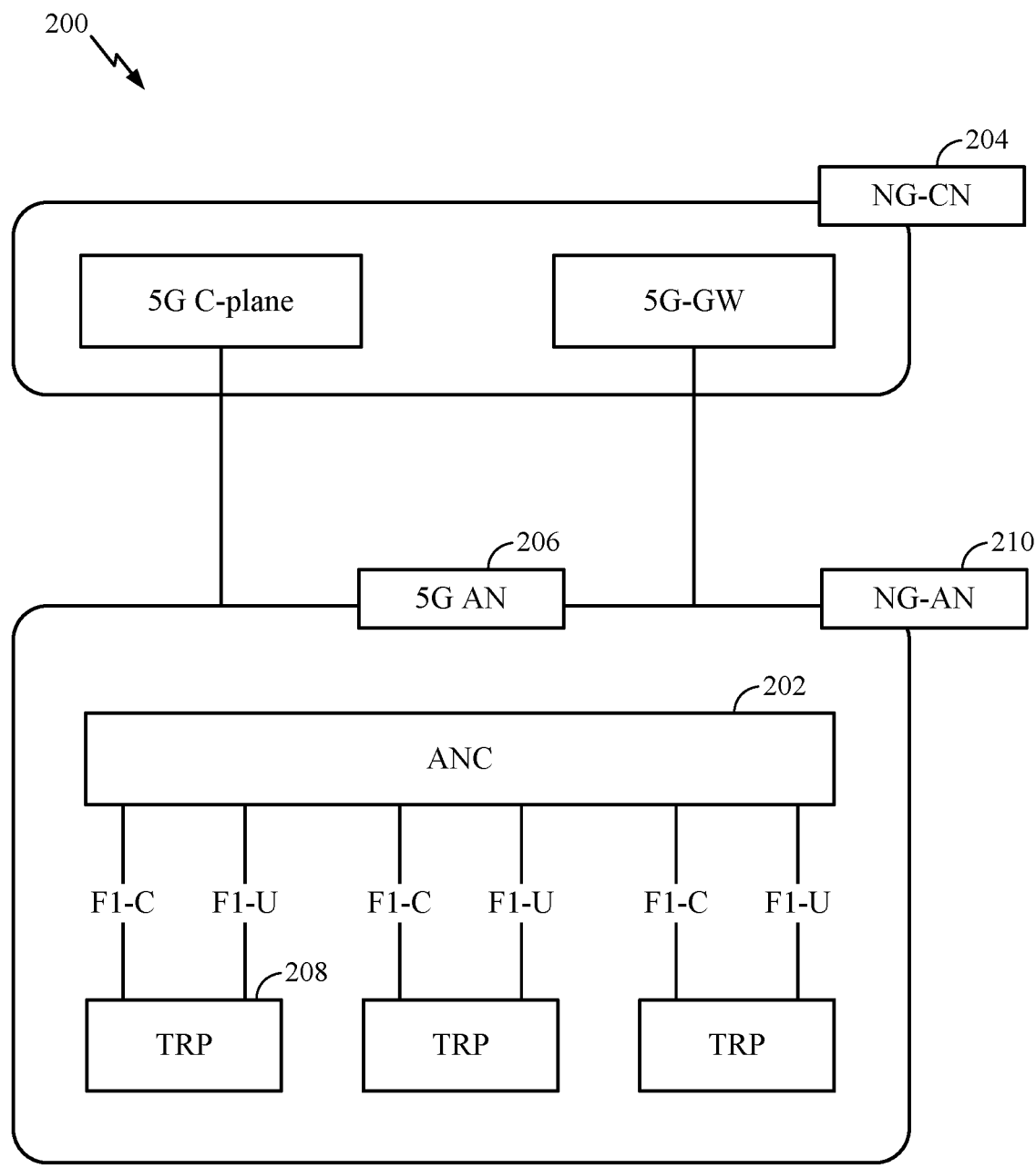
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, NodeBs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed and/or present.

According to aspects, a dynamic configuration of split logical functions may be present within the architecture 200. As will be described in more detail with reference to FIG. 5, the Radio Resource Control (RRC) layer, Packet Data. Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
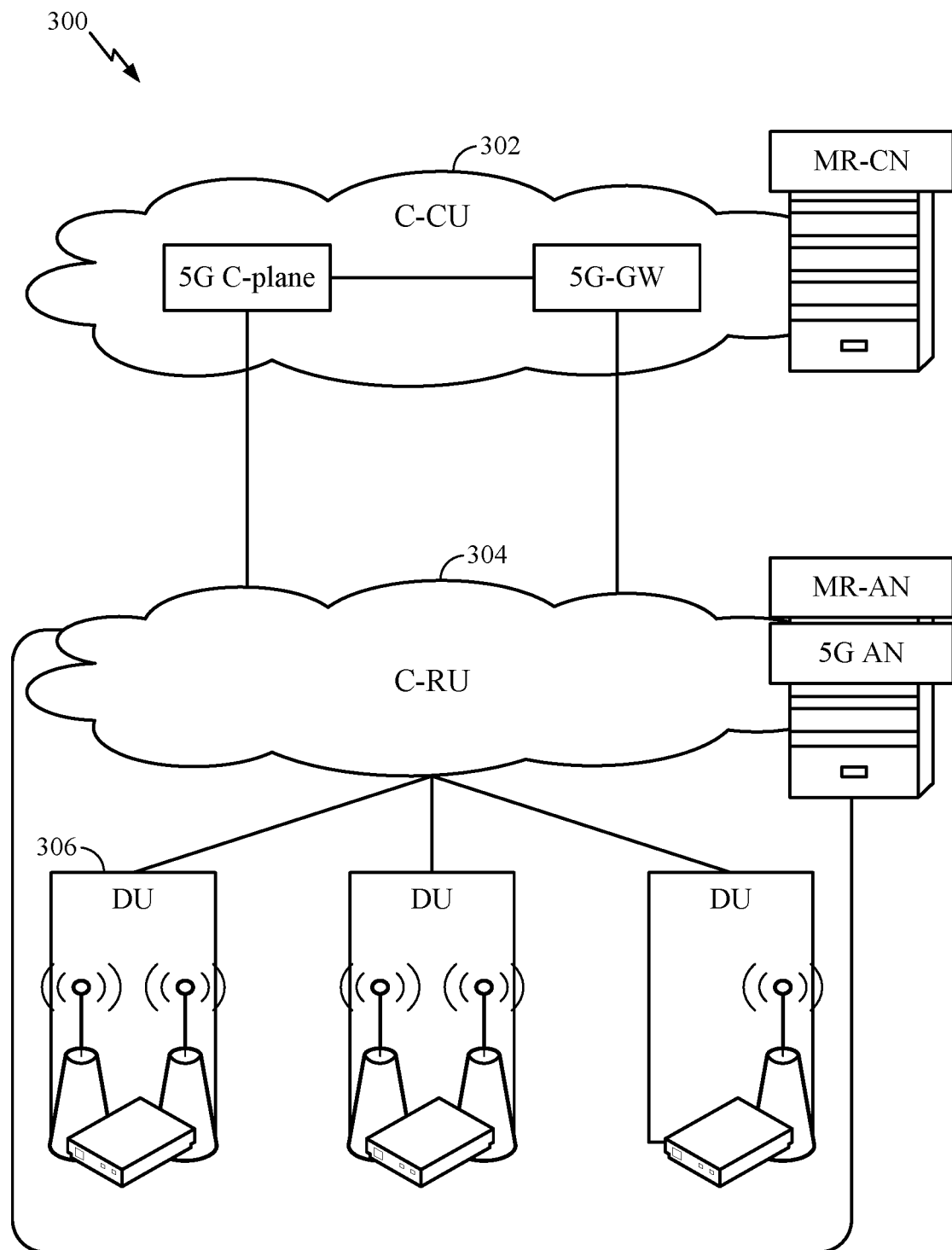
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
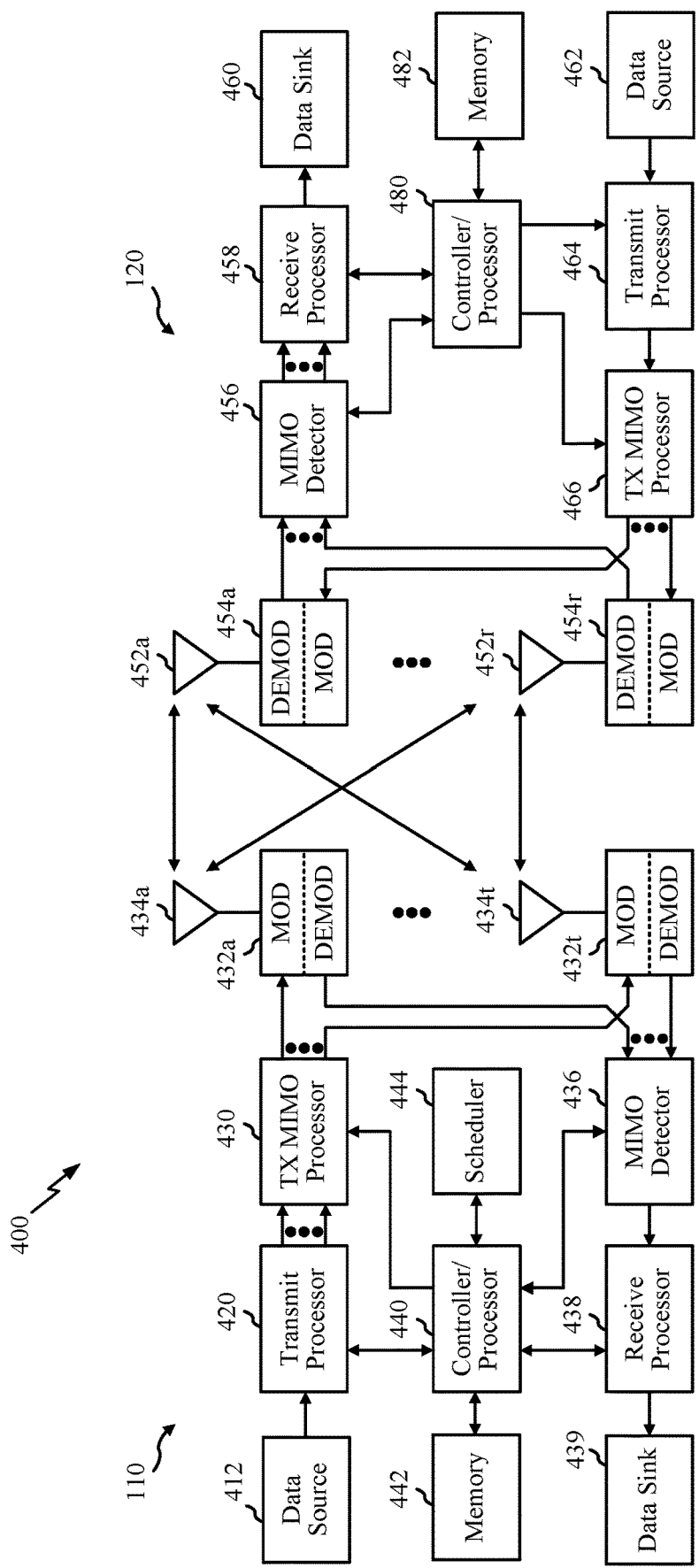
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
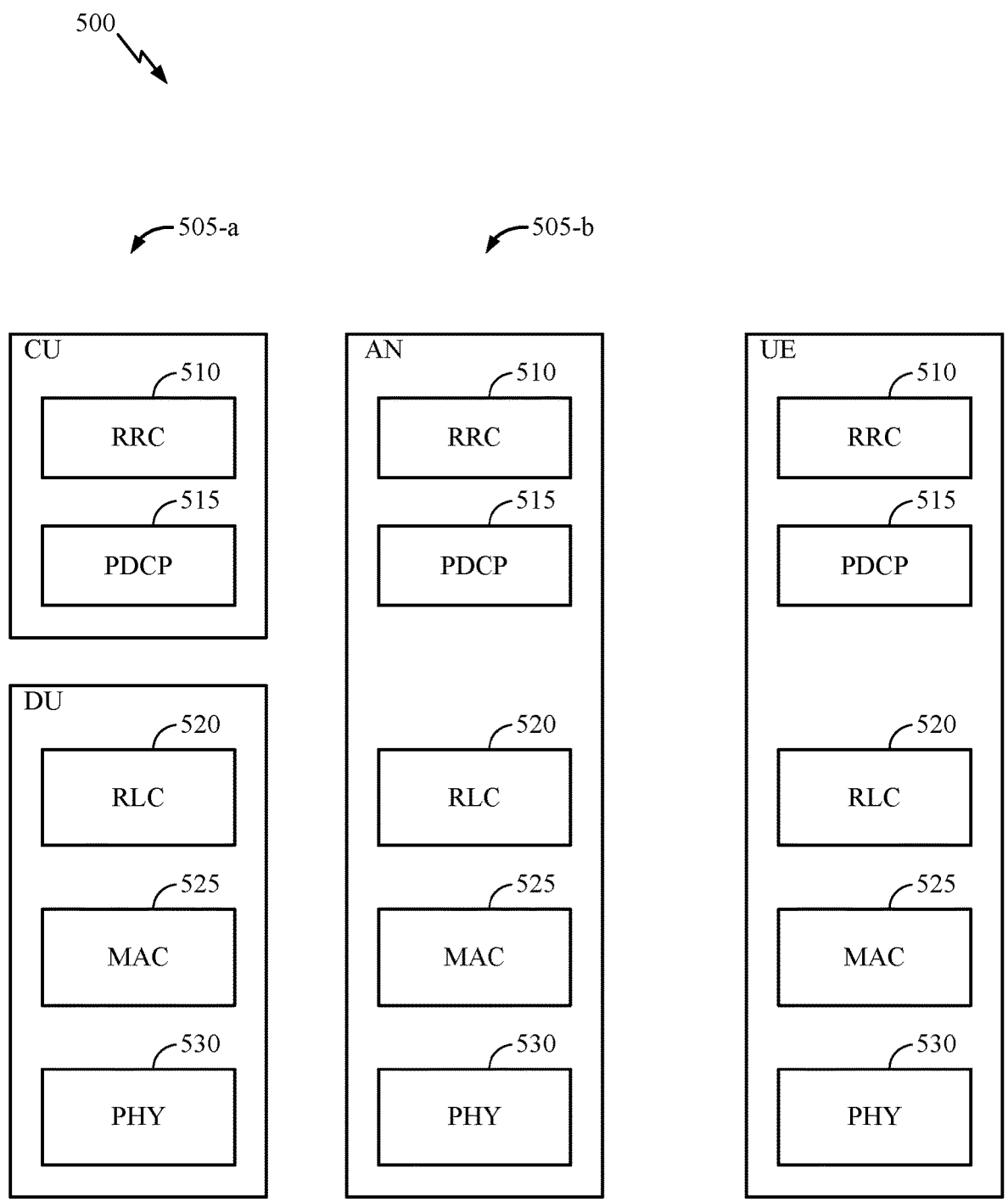
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
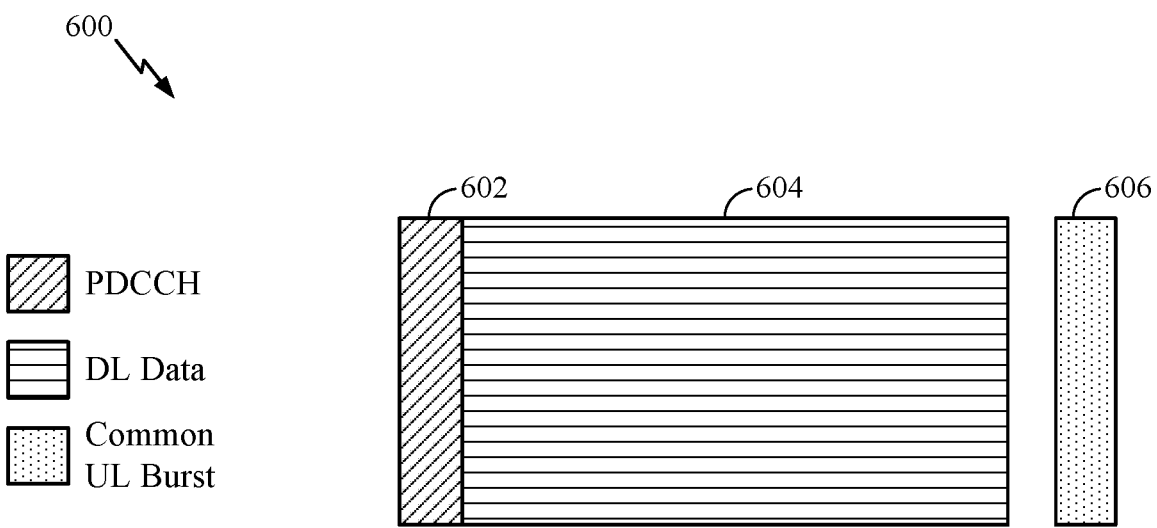
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
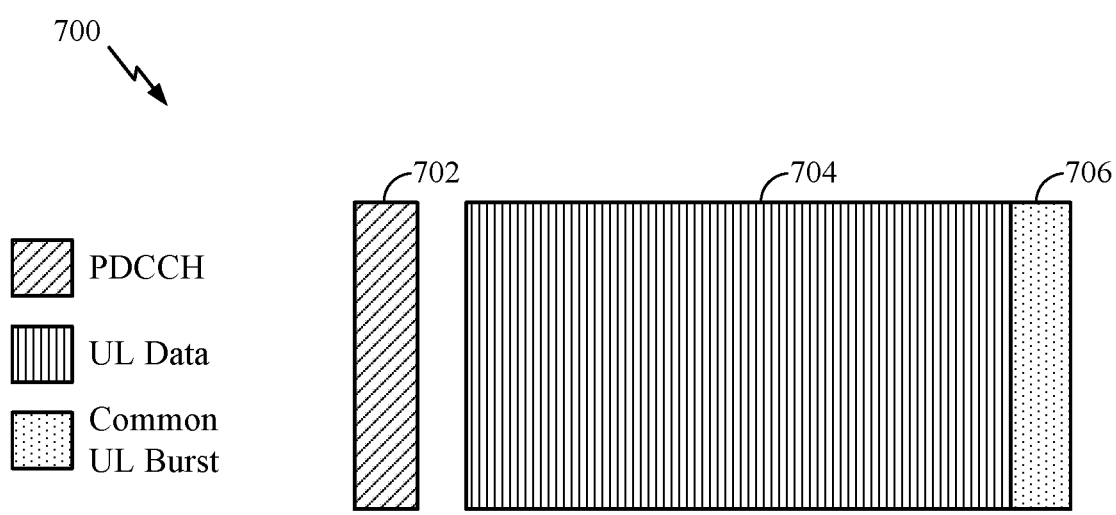
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
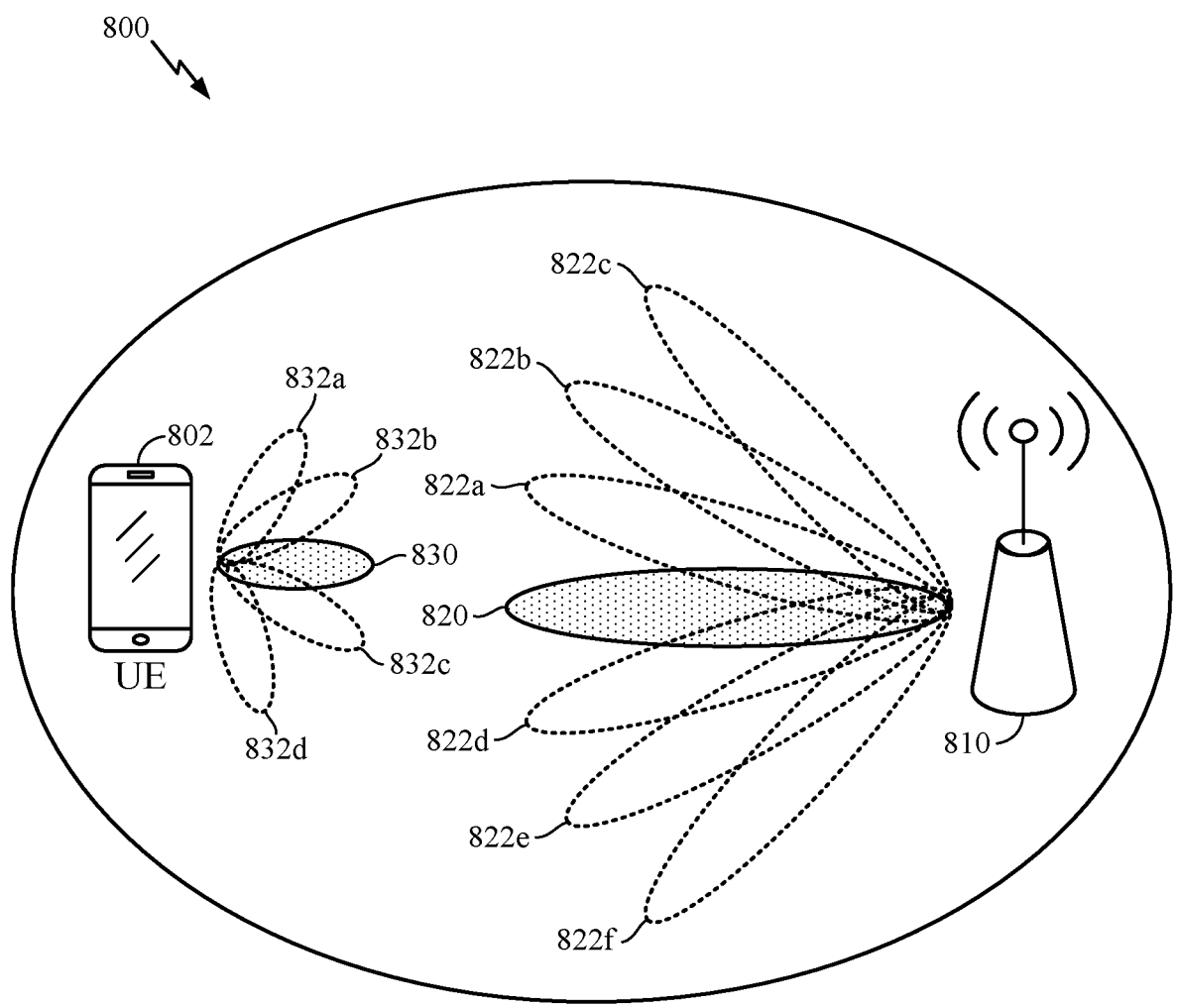
FIG. 8 shows an exemplary wireless communications system, in accordance with certain aspects of the present disclosure.

In NR, a UE may be served by one or more BSs or TRPs using single or multiple beams, as depicted in FIG. 8. FIG. 8 shows an exemplary wireless communications system 800 in which a UE 802 is being served by a TRP 810 using a transmit beam 820. A receive beam 830 of the UE is generally aligned with the transmit beam 820. The TRP (or, for example, a BS) may be capable of communicating via one or more other transmit beams 822a-822f. Similarly, the UE may be capable of communicating via one or more other receive beams 832a-832d. Each transmit beam 820, 822 of the BS may be collocated with a receive beam of the BS. Similarly, each receive beam 830, 832 of the UE may be collocated with a transmit beam of the UE.

Example Beam Selection and Radio Link Failure During Beam Recovery

Some wireless systems (e.g., 5G systems, eMBB systems) encounter difficulties with high path loss in communication links. New techniques, such as hybrid beamforming (e.g., analog and digital beamforming), which are not present in 3G and 4G systems, may be used in newer wireless systems to overcome the difficulties caused by high path loss. Hybrid beamforming may create a beam pattern to users (e.g., UEs) that can enhance link budgets and/or improve signal-to-noise ratio (SNR) for communications to users (e.g., UEs).

According to aspects of the present disclosure, in multi-beam operation, active beam pairs (e.g., pairs of transmit and receive beams) used for communication by a nodeB (NB) and a UE may be misaligned due to beam switch failure (e.g., beams being switched to other beams that experience so much interference or deep fade that communications are blocked) or signal blockage (e.g., caused by a UE moving into a shadow of a building). When a beam that an NB and a UE are using for communications becomes misaligned, then the NB and the UE may not be able to communicate control information or data over active beams.

In aspects of the present disclosure, when an active beam pair used by an NB (e.g., a serving cell) and a UE becomes misaligned, alternative beams from a serving cell may be available for the UE and NB to use for beam recovery (i.e., recovery of the communications link). Selecting the same beam and/or beam direction as the (misaligned) active beam pair may cause a beam recovery process (e.g., messages used to recover the communications link) to be blocked (e.g., by the same cause as caused the active beam to be misaligned in the first place).

According to previously known techniques, alternative beams from a serving cell may not be known to be available when an active beam becomes misaligned. In addition, having a UE perform a radio link failure (RLF) procedure when a beam becomes misaligned requires communications between the UE and a serving cell to wait for the RLF procedure to complete in order to recover a communications link, possibly resulting in a long delay.

According to aspects of the present disclosure, a UE may select an alternative beam (when multiple beams are available) for transmitting beam recovery message(s) via a scheduling request (SR) procedure and/or a random access channel (RACH) procedure.

In some aspects of the present disclosure, a UE may declare RLF (e.g., perform an RLF procedure) or perform a forward handover procedure when alternative beams are not available from a serving cell of the UE.

According to aspects of the present disclosure, an NB may configure a UE with one or more alternative beams to use for beam recovery if an active beam pair becomes misaligned.

In some aspects of the present disclosure, a UE may configure a set of alternative beams based on measurements (e.g., reference signal received power (RSRP), reference signal received quality (RSRQ), or signal-to-noise ratio (SNR)) of beams made by the UE. That is, a UE may determine a set of alternative beams to use to send one or more beam recovery messages based on measuring parameters of the radio frequency environment instead of or in addition to obtaining an indication of alternative beams from a serving NB.

According to aspects of the present disclosure, a UE may trigger an RLF (e.g., begin an RLF procedure) based on a number of scheduling request (SR) procedures and/or random access channel (RACH) procedures that have failed. That is, a UE may be configured with a threshold number of SR procedure failures and/or RACH procedure failures. If the UE experiences misalignment of an active beam pair, transmits beam recovery messages via an SR procedure and/or a RACH procedure, and detects that the threshold number of SR procedures and/or RACH procedures have failed (e.g., the UE does not receive a response(s)), then the UE may begin an RLF procedure.

In aspects of the present disclosure, a UE may detrigger an RLF procedure, based on successfully decoding a PDCCH. That is, if a UE has triggered an RLF based on beam misalignment and failure of SR and/or RACH procedures transmitting beam recovery messages, the UE may terminate the RLF procedure without completing the RLF procedure, if the UE successfully decodes a PDCCH. Alternatively, decoding a control channel (e.g., a PDCCH) may be used to change the counters and/or metrics used for RLF. That is, commands in a control channel may directly change configured counters and/or metrics used in the RLF procedure. A UE that has counters and/or metrics of an RLF procedure changed in a control channel may quickly recover from such a procedure.

Figure 9:
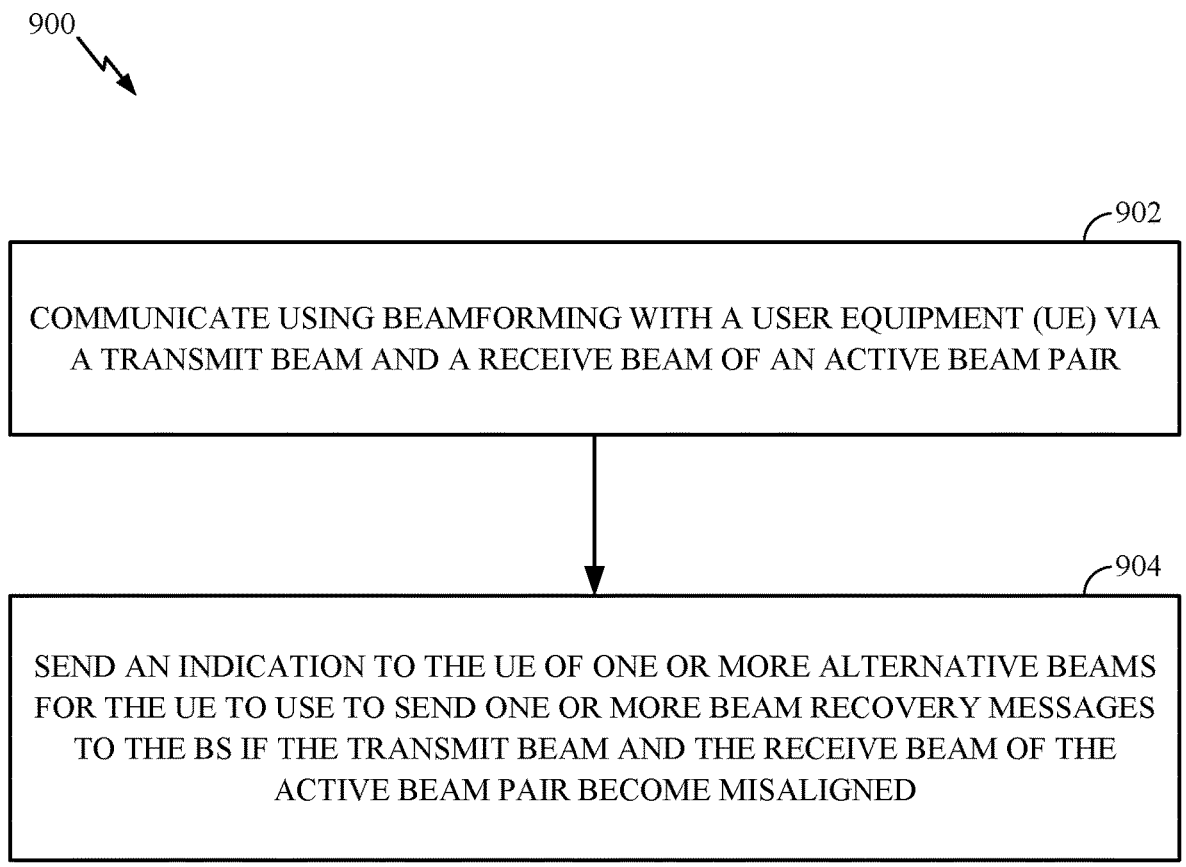
FIG. 9 illustrates example operations for wireless communications, in accordance with aspects of the present disclosure.

FIG. 9 illustrates example operations 900 for wireless communications, in accordance with aspects of the present disclosure. Operations 900 may be performed by a BS (e.g., an NB), for example, BS 110, shown in FIG. 1 and TRP 810, shown in FIG. 8.

Operations 900 begin, at block 902, with the BS communicating using beamforming with a user equipment (UE) via a transmit beam and a receive beam of an active beam pair. For example, BS 810 (shown in FIG. 8) may communicate using beamforming with UE 802 via a transmit beam 820 and a receive beam 830 of an active beam pair. In the example, the BS may transmit to the UE via the transmit beam 820 and receive signals from the UE via a receive beam collocated with the transmit beam; similarly, the UE may receive signals from the BS via the receive beam 830 and transmit signals to the BS via a transmit beam collocated with the receive beam.

At block 904, operations 900 continue with the BS sending an indication to the UE of one or more alternative beams for the UE to use to send a beam recovery message to the BS if the transmit beam and the receive beam of the active beam pair become misaligned. Continuing the example, the BS 810 may send an indication of a transmit beam 822a and a receive beam collocated with the transmit beam for the UE 802 to use to send a beam recovery message to the BS if the transmit beam 820 and receive beam 830 of the active beam pair become misaligned.

Figure 10:
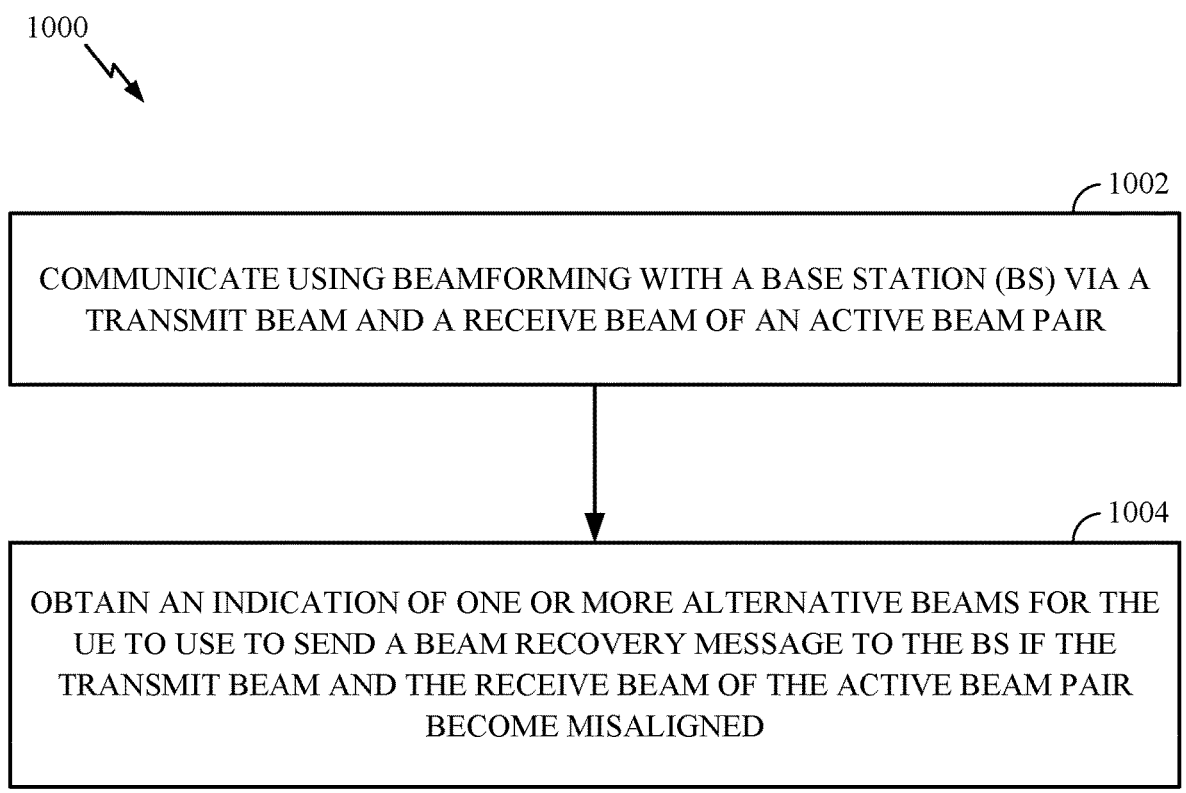
FIG. 10 illustrates example operations for wireless communications, in accordance with certain aspects of the present disclosure.

FIG. 10 illustrates example operations 1000 for wireless communications, in accordance with aspects of the present disclosure. Operations 1000 may be performed by a UE, for example, UE 120, shown in FIG. 1. Operations 1000 may be complementary to operations 900, described above with reference to FIG. 9.

Operations 1000 begin, at block 1002, with the UE communicating using beamforming with a base station (BS) via a transmit beam and a receive beam of an active beam pair. For example, UE 802 (shown in FIG. 8) may communicate using beamforming with BS 810 via a transmit beam 820 and a receive beam 830 of an active beam pair. In the example, the UE may receive signals from the BS via the receive beam 830 and transmit signals to the BS via a transmit beam collocated with the receive beam; similarly, the BS may transmit to the UE via the transmit beam 820 and receive signals from the UE via a receive beam collocated with the transmit beam.

At block 1004, operations 1000 continue with the UE obtaining an indication of one or more alternative beams for the UE to use to send a beam recovery message to the BS if the transmit beam and the receive beam of the active beam pair become misaligned. Continuing the example, the BS 810 may send an indication of a transmit beam 822a and a receive beam collocated with the transmit beam for the UE 802 to use to send a beam recovery message to the BS if the transmit beam 820 and receive beam 830 of the active beam pair become misaligned.

According to aspects of the present disclosure, an NB may send a configuration, indicating alternative beams for a UE to use for beam recovery (e.g., as in block 904 shown in FIG. 9), using layer 1 (L1) signaling (e.g., a PHY signal), layer 2 (L2) signaling (e.g., a MAC control element) and/or radio resource control (RRC) messaging.

In aspects of the present disclosure, an NB may configure a threshold on a UE for the UE to use in selecting an alternative beam from a set of alternative beams when the UE is attempting beam recovery (e.g., after a transmit and receive beam of an active beam pair becomes misaligned). A UE receiving or otherwise obtaining the threshold may determine which alternative beam to select based on the threshold.

According to aspects of the present disclosure, an NB may configure a signal quality threshold on a UE for the UE to use to select (e.g., to use for sending beam recovery messages) one or more of the other alternative beams that are within the threshold of the best alternative beam (e.g., treating the threshold as a relative threshold) and/or greater than or equal to the threshold (e.g., treating the threshold as an absolute threshold). The UE may use a signal-to-noise ratio (SNR), a reference signal received quality (RSRQ), and/or a reference signal received power (RSRP) of the alternative beam(s) when comparing the one or more alternative beams to the threshold.

In aspects of the present disclosure, an NB may configure a directional threshold for assisting the UE to select another beam in another direction for sending a beam recovery message using an SR message and/or a RACH message. For example, BS 810 (shown in FIG. 8) may configure UE 802 with a directional threshold of +/−30 degrees to assist the UE to select another beam in another direction for sending a beam recovery message using an SR message to the BS. In the example, if the active transmit beam 820 and active receive beam 830 become misaligned, the UE may determine to send SR messages to the BS via transmit beams collocated with receive beams 832b and 832c because those beams are within the directional threshold of +/−30 degrees of the active receive beam 830. Still in the example, the UE may determine not to send SR messages via transmit beams collocated with receive beams 832a and 832d because those beams are not within the directional threshold of +/−30 degrees of the active receive beam 830.

According to aspects of the present disclosure, when a UE is configured with a directional threshold, the UE may determine an alternative beam to use for sending a beam recovery message based on a difference in direction (e.g., measured in degrees of arc) between the failed active beam and an alternative beam.

In aspects of the present disclosure, if a UE determines that no alternative beam meeting the direction criteria (e.g., is within the directional threshold) is available, then UE sends a beam recovery message using the best alternative beam. A UE may determine a best alternative beam based on an SNR, RSRQ, and/or RSRP of the alternative beam(s). For example, BS 810 (shown in FIG. 8) may configure UE 802 with a directional threshold of +/−5 degrees to assist the UE to select another beam in another direction for sending a beam recovery message using a RACH message to the BS. In the example, if the active transmit beam 820 and active receive beam 830 become misaligned, the UE may determine that no alternative beam is within the directional threshold of +/−5 degrees of the active receive beam 830. Still in the example, the UE may determine that RSRQ of the BS, as measured on receive beam 832c, is higher than RSRQ of the BS on other receive beams and the UE may then send a beam recovery RACH message via a transmit beam collocated with receive beam 832c.

According to aspects of the present disclosure, when beam misalignment occurs on an active beam pair, a UE may send a beam recovery request over one of the alternative beams (e.g., obtained via an indication, as in block 1004 in FIG. 10) that meets a signal quality threshold and/or direction threshold, if there is one, configured on the UE.

In aspects of the present disclosure, if a UE determines that no alternative beam meets the direction criteria, then the UE may send one or more beam recovery requests in the same direction as the failed active beam.

According to aspects of the present disclosure, when beam misalignment occurs on an active beam pair and no alternative beams greater than or equal to a threshold (e.g., a signal quality threshold) are available for the serving cell (e.g., included in the alternative beams indicated to a UE), then a UE may declare an RLF immediately (e.g., without waiting for a timer to expire as is done with other RLFs) and/or perform a forward handover to another cell.

In aspects of the present disclosure, when beam misalignment occurs on an active beam pair and alternative beams from a serving cell are less than a threshold (e.g., a signal quality threshold) and signal quality of one or more beams from a cell neighboring the serving cell are greater than or equal to a threshold, then a UE may perform a forward handover to the neighboring cell (e.g., after declaring an RLF).

According to aspects of the present disclosure, an NB may configure a UE to transmit one or more beam recovery messages (e.g., SR messages, RACH messages) via a particular transmit beam shape when the UE determines that a transmit beam and a receive beam of an active beam pair are misaligned. The particular shape may comprise a broad beam or a pseudo-omnidirectional beam. Transmitting a beam recovery message via a particular beam shape may improve the possibility of the NB receiving the beam recovery message from one or more transmission and reception points and/or reduce the time needed for the UE to refine receive and transmit beams for the UE.

In aspects of the present disclosure, an NB may configure one or more beams as reference beams and/or reference signals that are quasi co-located with an active beam. The active beam may be used for conveying data and/or control information to a UE.

According to aspects of the present disclosure, beams configured as reference beams and/or reference signals may convey one or a combination of new radio synchronization signals (NR-SS), channel state information reference signals (CSI-RS), and other types of reference signals.

In aspects of the present disclosure, an NB may send an indication of one or more beams configured as one or more reference beams or reference signals via RRC messages, L1 signaling (e.g., PHY signaling), or L2 messages (e.g., MAC control elements).

According to aspects of the present disclosure, an NB may send (e.g., via RRC messages) a signal quality threshold to a UE. If a signal quality of a reference beam falls below the threshold, then the UE may assume that a quality of an active beam corresponding to the reference beam has degraded. For example, an NB may send a signal quality threshold to a UE and a configuration indicating an active beam pair corresponds to a reference beam. In the example, the UE may detect that signal quality of the reference beam is lower than the signal quality threshold before detecting that the signal quality of the active beam pair has degraded (e.g., the active beam pair is semi-persistently scheduled), and the UE may assume that signal quality of the active beam pair is degraded and start a beam recovery procedure, for example.

In aspects of the present disclosure, an NB may signal to a UE a configuration indicating a number of failed SR, RACH, and/or other beam recovery attempts that the UE may experience to cause the UE to trigger RLF, speed up the RLF procedure (e.g., by shortening periods between steps of the RLF procedure), or terminate one or more timers associated with the RLF procedure early.

According to aspects of the present disclosure, an NB may signal to a UE a configuration indicating a number of PDCCH decoding successes and/or PDSCH decoding successes that the UE may experience to cause the UE to detrigger (e.g., stop completion of) an RLF procedure, speed up detrigger of the RLF procedure (e.g., by shortening periods between steps required to terminate without completing the RLF procedure), or terminate one or more timers associated with the RLF procedure early. After detriggering an RLF procedure and/or terminating the timers associated with the RLF procedure early, the UE remains on the serving cell, instead of handing over to another cell.

In aspects of the present disclosure, an NB may signal to a UE a configuration indicating a number of PDCCH decoding successes and/or PDSCH decoding successes that the UE may experience to cause the UE to detrigger (e.g., stop completion of) a beam recovery procedure, speedup detrigger of the beam recovery procedure (e.g., by shortening periods between steps required to terminate without completing the beam recovery procedure), or terminate timers, associated with beam recovery procedure, early.

According to aspects of the present disclosure, when a UE detects active beam failure, i.e., when a signal quality of one or more reference beams from an NB falls below a threshold, the UE may try beam recovery using UL resources such as beam recovery resources, scheduling requests, and/or RACH resources. If the beam recovery fails a threshold number of attempts, where the threshold may be indicated in a configuration received from the NB, then the UE may trigger RLF, speed up the RLF procedure, or terminate one or more timers associated with the RLF procedure early. After completing the RLF procedure, the UE may select a suitable cell and perform a forward handover to the suitable cell or enter an idle state.

In aspects of the present disclosure, after a UE has triggered an RLF procedure (e.g., due to beam recovery procedures failing a threshold number of times, as described above), if PDCCH decoding and/or PDSCH decoding is successful over one or more transmissions, then the UE may terminate the RLF procedure (e.g., detrigger the RLF procedure), speed up detriggering of the RLF procedure, or terminate timers, associated with the RLF procedure, early. After detriggering an RLF procedure and/or terminating the timers associated with the RLF procedure early, the UE remains on the serving cell, instead of handing over to another cell.

According to aspects of the present disclosure, after a UE has triggered a beam recovery procedure, if PDCCH decoding and/or PDSCH decoding is successful over one or more transmissions, then the UE may stop the beam recovery procedure or terminate one or more timers associated with the beam recovery procedure early. After stopping a beam recovery procedure and/or terminating the timers associated with the beam recovery procedure early, the UE remains on the serving cell, instead of handing over to another cell.

Figure 11:
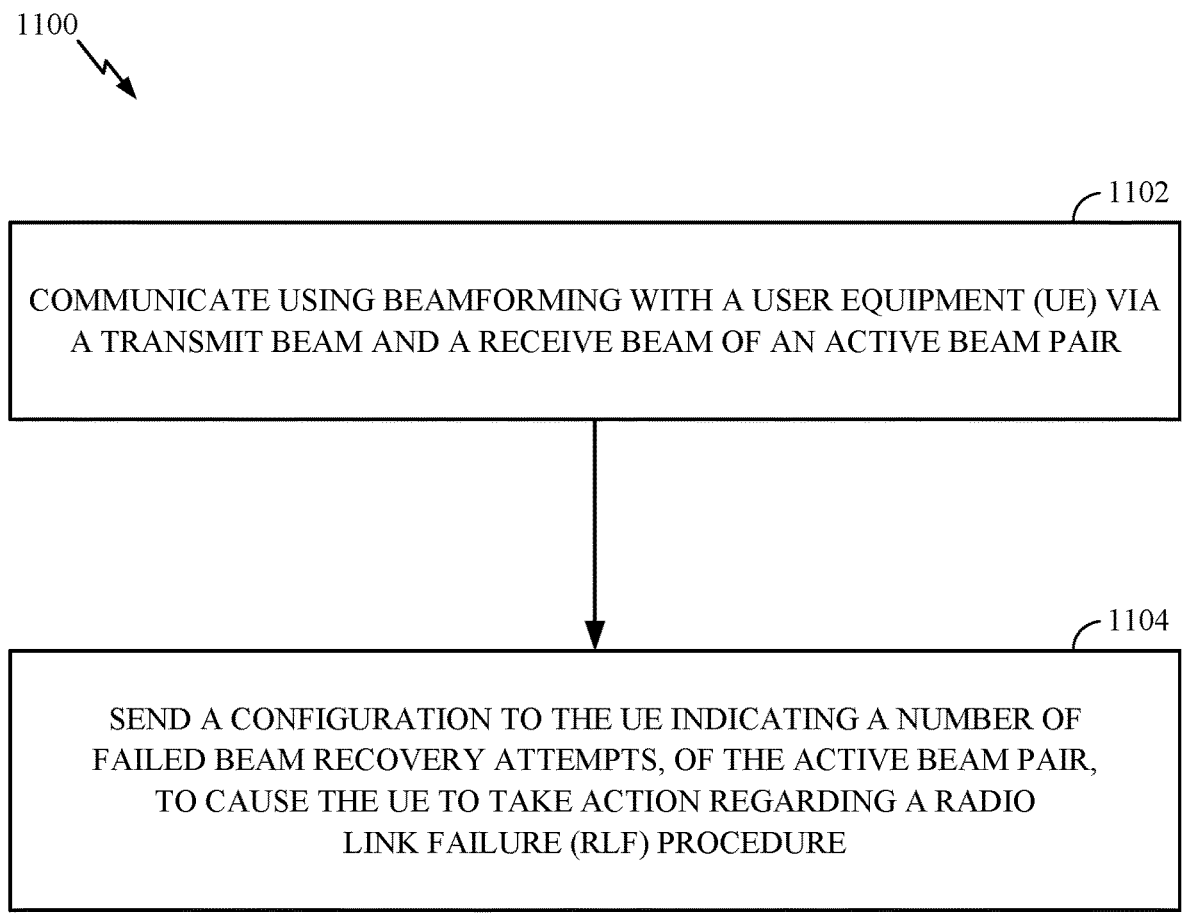
FIG. 11 illustrates example operations for wireless communications, in accordance with certain aspects of the present disclosure.

FIG. 11 illustrates example operations 1100 for wireless communications, in accordance with aspects of the present disclosure. Operations 1100 may be performed by a BS (e.g., an NB), for example, BS 110, shown in FIG. 1 or TRP 810, shown in FIG. 8.

Operations 1100 begin, at block 1102, with the BS communicating using beamforming with a user equipment (UE) via a transmit beam and a receive beam of an active beam pair. For example, BS 810 (shown in FIG. 8) may communicate using beamforming with UE 802 via an active transmit beam 820 and receive beam 830. In the example, the BS may transmit to the UE via the transmit beam 820 and receive signals from the UE via a receive beam collocated with the transmit beam; similarly, the UE may receive signals from the BS via the receive beam 830 and transmit signals to the BS via a transmit beam collocated with the receive beam.

At block 1104, operations 1100 continue with the BS sending a configuration to the UE indicating a number of failed beam recovery attempts, of the active beam pair, to cause the UE to take action regarding a radio link failure (RLF) procedure. Continuing the example, the BS 810 may send (e.g., via RRC signaling) a configuration to the UE 802 indicating that the UE should make two failed beam recovery attempts of the beams 820 and 830 before the UE starts an RLF procedure.

Figure 12:
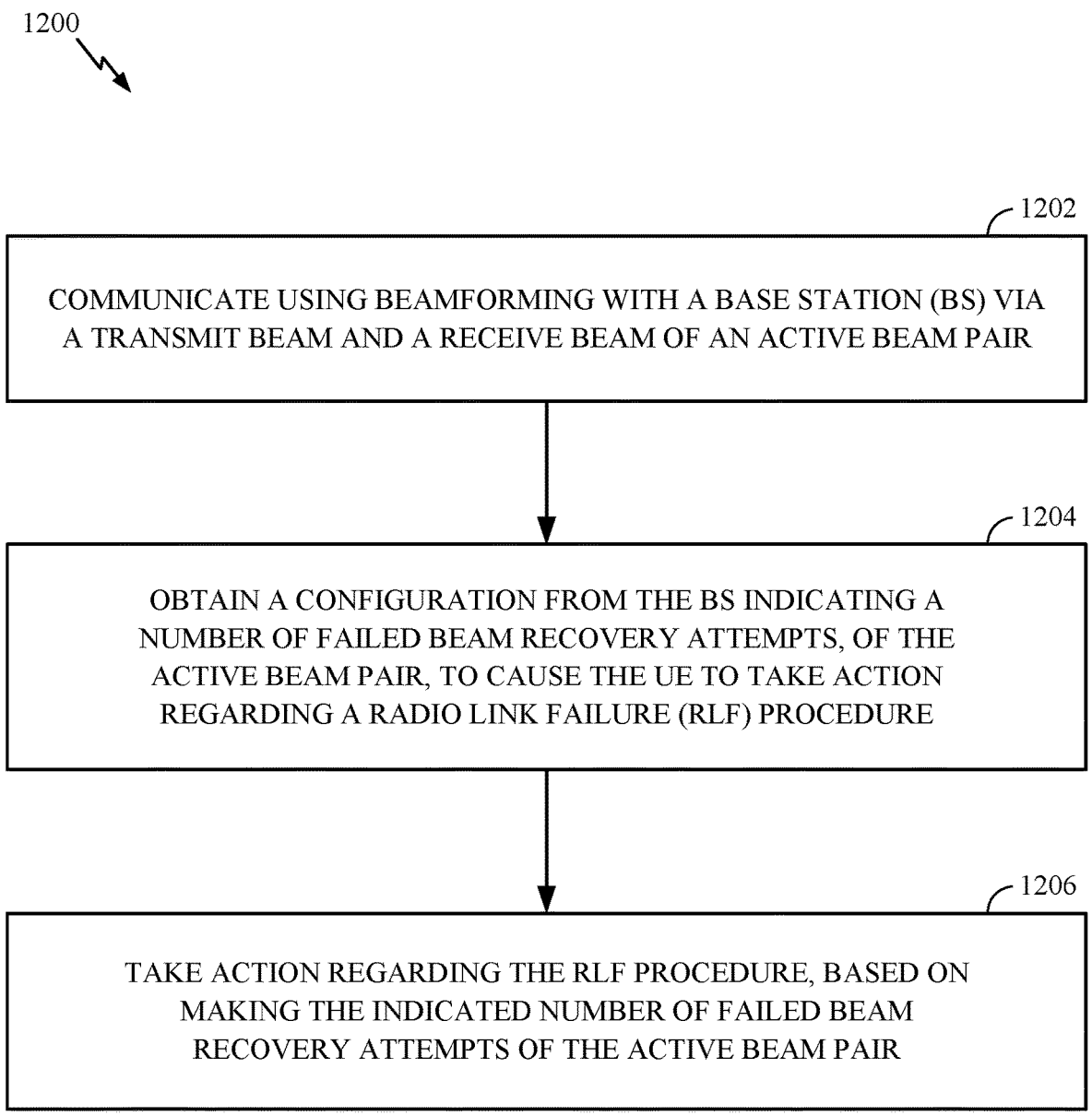
FIG. 12 illustrates example operations for wireless communications, in accordance with certain aspects of the present disclosure.

FIG. 12 illustrates example operations 1200 for wireless communications, in accordance with aspects of the present disclosure. Operations 1200 may be performed by a UE, for example, UE 120, shown in FIG. 1 or UE 802, shown in FIG. 8. Operations 1200 may be complementary to operations 1100, described above with reference to FIG. 11.

Operations 1200 begin, at block 1202, with the UE communicating using beamforming with a base station (BS) via a transmit beam and a receive beam of an active beam pair. For example, UE 802 (shown in FIG. 8) may communicate using beamforming with BS 810 via a transmit beam 820 and receive beam 830 of an active beam pair. In the example, the UE may receive signals from the BS via the receive beam 830 and transmit signals to the BS via a transmit beam collocated with the receive beam; similarly, the BS may transmit to the UE via the transmit beam 820 and receive signals from the UE via a receive beam collocated with the transmit beam.

At block 1204, operations 1200 continue with the UE obtaining a configuration from the BS indicating a number of failed beam recovery attempts, of the active beam pair, to cause the UE to take action regarding a radio link failure (RLF) procedure. Continuing the example, the UE 802 may receive (e.g., via RRC signaling) a configuration from the BS 810 indicating that the UE should attempt two beam recovery attempts of the beams 820 and 830 before the UE starts an RLF procedure.

At block 1206, operations 1200 continue with the UE taking action regarding the RLF procedure, based on making the indicated number of failed beam recovery attempts of the active beam pair. Continuing the example from above, the UE 802 sends two beam recovery messages (e.g., SR messages) to attempt to recover the beams 820 and 830. Still in the example, the UE is not successful in recovering the beams (e.g., the UE receives no responses, or receives a response but is not able to reestablish communications with the BS) and starts the RLF procedure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a base station (BS), comprising:
communicating using beamforming with a user equipment (UE) via an active beam;
sending a configuration in a radio resource control (RRC) signal to the UE, the configuration indicating one or more alternative beams for the UE to use to send one or more beam recovery messages to the BS when a beam failure associated with the active beam is detected at the UE and indicating a threshold for the UE to use for selecting an alternative beam from the one or more alternative beams, wherein the threshold comprises a directional threshold and a reference signal received power (RSRP) threshold associated with a channel state information reference signal and a synchronization signal, wherein when no alternative beam of the one or more alternative beams meets the directional threshold, the configuration indicates a best alternative beam of the one or more alternative beams based on the RSRP threshold;

receiving, from the UE after sending the configuration, a beam recovery message via at least one of the one or more alternative beams, wherein the beam recovery message includes a random access channel message; and performing a random access channel procedure, based on the beam recovery message, with the UE via the at least one of the one or more alternative beams.

2. The method of claim 1, wherein the RSRP threshold comprises a maximum difference between a signal quality of a selected alternative beam and a signal quality of the best alternative beam.

3. The method of claim 1, wherein the RSRP threshold comprises a minimum signal quality.

4. The method of claim 1, wherein the directional threshold comprises a maximum difference between a direction of a selected alternative beam and a direction of the active beam.

5. The method of claim 1, further comprising:
configuring the UE to use a particular beam shape for sending the one or more beam recovery messages in one or more directions.

6. A method for wireless communications performed by a user equipment (UE), comprising:
communicating using beamforming with a base station (BS) via an active beam;
obtaining a configuration, in a radio resource control (RRC) signal, indicating one or more alternative beams for the UE to use to send one or more beam recovery messages to the BS when a beam failure associated with the active beam is detected at the UE and indicating a first threshold for the UE to use for selecting an alternative beam from the one or more alternative beams, wherein the first threshold comprises a directional threshold and a reference signal received power (RSRP) threshold associated with a channel state information reference signal and a synchronization signal, wherein when no alternative beam of the one or more alternative beams meets the directional threshold, the configuration indicates a best alternative beam of the one or more alternative beams based on the RSRP threshold;
detecting the beam failure associated with the active beam;
in response to the detection, selecting an alternative beam from the one or more alternative beams after obtaining the configuration based on the first threshold; and
performing a random access channel procedure via the selected alternative beam by at least in part sending, to the BS, a beam recovery request via the selected alternative beam, wherein the beam recovery request includes a random access channel message.

7. The method of claim 6, wherein the RSRP threshold comprises a maximum difference between a signal quality of the selected alternative beam and a signal quality of the best alternative beam.

8. The method of claim 6, wherein the RSRP threshold comprises a minimum signal quality.

9. The method of claim 6, wherein the directional threshold comprises a maximum difference between a direction of the selected alternative beam and a direction of the active beam.

10. The method of claim 6, further comprising:
obtaining a second threshold; and
declaring a radio link failure (RLF), based on no signal qualities of the one or more alternative beams being greater than or equal to the second threshold.

11. The method of claim 6, further comprising:
obtaining a third threshold;
detecting a beam from a neighboring cell; and
performing a forward handover (HO) to the neighboring cell, based on a signal quality of the beam from the neighboring cell being greater than or equal to the third threshold and all signal qualities of the one or more alternative beams being less than the third threshold.

12. The method of claim 6, further comprising:
obtaining a configuration to use a particular beam shape for sending the one or more beam recovery messages in one or more directions.

13. A method for wireless communications performed by a user equipment (UE), comprising:
communicating using beamforming with a base station (BS) via an active beam;
obtaining a configuration, in a radio resource control (RRC) signal, indicating one or more alternative beams for the UE to use to send one or more beam recovery messages to the BS when a beam failure associated with the active beam is detected at the UE and indicating a first threshold for the UE to use for selecting an alternative beam from the one or more alternative beams, wherein the first threshold comprises a reference signal received power (RSRP) threshold associated with a channel state information reference signal and a synchronization signal;
detecting the beam failure associated with the active beam;
in response to the detection, selecting an alternative beam from the one or more alternative beams after obtaining the configuration based on the first threshold; and
performing a random access channel procedure via the selected alternative beam by at least in part sending, to the BS, a beam recovery request via the selected alternative beam, wherein the beam recovery request includes a random access channel message;
determining that no alternative beam of the one or more alternative beams meets a direction criterion; and
transmitting the beam recovery request in a same direction as the active beam.

14. An apparatus for wireless communications, comprising:
one or more processors configured to:
cause the apparatus to communicate using beamforming with a user equipment (UE) via an active beam;
cause the apparatus to send a configuration in a radio resource control (RRC) signal to the UE, the configuration indicating one or more alternative beams for the UE to use to send one or more beam recovery messages to the apparatus when a beam failure associated with the active beam is detected at the UE and indicating a threshold for the UE to use for selecting an alternative beam from the one or more alternative beams, wherein the threshold comprises a directional threshold and a reference signal received power (RSRP) threshold associated with a channel state information reference signal and a synchronization signal, wherein when no alternative beam of the one or more alternative beams meets the directional threshold, the configuration indicates a best alternative beam of the one or more alternative beams based on the RSRP threshold;
cause the apparatus to receive, from the UE after sending the configuration, a beam recovery message via at least one of the one or more alternative beams, wherein the beam recovery message includes a random access channel message; and cause the apparatus to perform a random access channel procedure, based on the beam recovery message, via the at least one of the one or more alternative beams; and one or more memories coupled with the one or more processors.

15. The apparatus of claim 14, wherein the RSRP threshold comprises a minimum signal quality.

16. An apparatus for wireless communications, comprising:

one or more processors configured to:

cause the apparatus to communicate using beamforming with a base station (BS) via an active beam;

obtain a configuration in a radio resource control (RRC) signal from the BS, the configuration indicating one or more alternative beams for the apparatus to use to send one or more beam recovery messages to the BS when a beam failure associated with the active beam is detected at the apparatus and indicating a threshold for the apparatus to use for selecting an alternative beam from the one or more alternative beams, wherein the threshold comprises a directional threshold and a reference signal received power (RSRP) threshold associated with a channel state information reference signal and a synchronization signal, wherein when no alternative beam of the one or more alternative beams meets the directional threshold, the configuration indicates a best alternative beam of the one or more alternative beams based on the RSRP threshold;

detecting the beam failure associated with the active beam;

select an alternative beam from the one or more alternative beams based on the threshold, in response to the detection after the apparatus obtains the configuration; and cause the apparatus to perform a random access channel procedure by at least in part transmitting a beam recovery request via the selected alternative beam, wherein the beam recovery request includes a random access channel message; and one or more memories coupled with the one or more processors.

17. An apparatus for wireless communications, comprising:

one or more processors configured to:

cause the apparatus to communicate using beamforming with a base station (BS) via an active beam;

obtain a configuration in a radio resource control (RRC) signal from the BS, the configuration indicating one or more alternative beams for the apparatus to use to send one or more beam recovery messages to the BS when a beam failure associated with the active beam is detected at the apparatus and indicating a threshold for the apparatus to use for selecting an alternative beam from the one or more alternative beams, wherein the threshold comprises a reference signal received power (RSRP) threshold associated with a channel state information reference signal and a synchronization signal;

detecting the beam failure associated with the active beam;

select an alternative beam from the one or more alternative beams based on the threshold, in response to the detection after the apparatus obtains the configuration; and cause the apparatus to perform a random access channel procedure by at least in part transmitting a beam recovery request via the selected alternative beam, wherein the beam recovery request includes a random access channel message;

determine that no alternative beam of the one or more alternative beams meets a direction criterion; and cause the apparatus to transmit the beam recovery request in a same direction as the active beam; and one or more memories coupled with the one or more processors.

* * * * *